US009329588B2

(12) United States Patent
Simpson et al.

(10) Patent No.: US 9,329,588 B2
(45) Date of Patent: May 3, 2016

(54) KEY CONTROL AND RELATED FLEET MANAGEMENT METHODS AND SYSTEMS

(75) Inventors: Alan Simpson, Fallbrook, CA (US); Paul Ernsdorff, Spokane, WA (US)

(73) Assignee: Assetworks Inc., Wayne, PA (US)

( * ) Notice: Subject to any disclaimer, the term of this patent is extended or adjusted under 35 U.S.C. 154(b) by 962 days.

(21) Appl. No.: 13/040,813

(22) Filed: Mar. 4, 2011

(65) Prior Publication Data
US 2011/0215897 A1 Sep. 8, 2011

Related U.S. Application Data

(60) Provisional application No. 61/310,882, filed on Mar. 5, 2010.

(51) Int. Cl.
*G06Q 10/00* (2012.01)
*G06F 19/00* (2011.01)
*H04B 14/00* (2006.01)
*G08B 1/08* (2006.01)
*G05B 19/00* (2006.01)

(52) U.S. Cl.
CPC ...................................... *G05B 19/00* (2013.01)

(58) Field of Classification Search
CPC ........ G05B 19/00; G06Q 10/00; G06F 19/00; H04B 14/00; G08B 1/08
USPC ..................... 340/5.1, 5.8, 5.81, 5.7; 705/1.1; 206/335; 235/385, 375
See application file for complete search history.

(56) References Cited

U.S. PATENT DOCUMENTS

| | | | | |
|---|---|---|---|---|
| 5,126,732 A * | 6/1992 | Mardon | | 340/5.33 |
| 5,223,829 A * | 6/1993 | Watabe | | 340/5.73 |
| 5,946,660 A * | 8/1999 | McCarty et al. | | 705/5 |
| 6,737,961 B2 * | 5/2004 | Flick | | 340/426.35 |
| 6,882,282 B1 * | 4/2005 | Lie-Nielsen et al. | | 340/686.1 |
| 6,999,825 B2 * | 2/2006 | Inomata | | 700/90 |
| 7,012,503 B2 * | 3/2006 | Nielsen | | 340/5.6 |
| 7,055,741 B2 * | 6/2006 | Bong et al. | | 235/382.5 |
| 7,075,451 B2 * | 7/2006 | Yamada | | 705/5 |
| 7,123,127 B2 * | 10/2006 | Mosgrove et al. | | 340/5.21 |
| 7,484,663 B2 * | 2/2009 | Olsen et al. | | 235/385 |
| 7,561,695 B2 * | 7/2009 | Koike | | G06Q 20/341 380/277 |
| 7,899,690 B1 * | 3/2011 | Weinstock et al. | | 705/5 |
| 7,949,541 B2 * | 5/2011 | McGinn et al. | | 705/1.1 |
| 7,961,076 B2 * | 6/2011 | Kelley | | B60R 25/257 340/426.13 |
| 8,160,906 B2 * | 4/2012 | Smith et al. | | 705/5 |
| 8,410,901 B2 * | 4/2013 | Mullin et al. | | 340/5.81 |
| 2007/0198311 A1 * | 8/2007 | Menendez et al. | | 705/5 |
| 2011/0140837 A1 * | 6/2011 | Lam | | G06F 21/31 340/5.51 |

* cited by examiner

*Primary Examiner* — Nam V Nguyen
(74) *Attorney, Agent, or Firm* — Sughrue Mion, PLLC

(57) ABSTRACT

A method and system for managing a fleet of vehicles including a reservation system for generating a reservation code; a key cabinet including user-entry means for entering said reservation code and one or more key compartments storing keys for each vehicle in the fleet; a control module in communication with the reservation system and the key cabinet for assigning an unlocked condition to at least one of the key compartments based on entry of a reservation code.

27 Claims, 6 Drawing Sheets

KEY CONTROL AND RELATED FLEET MANAGEMENT METHODS AND SYSTEMS

This application claims priority to U.S. Provisional Application No. 61/310,882, the contents of which are herein expressly incorporated by reference.

FIELD OF THE INVENTION

The present invention relates to the field of automotive fleet management methods and systems, and more specifically, to a key control method and system for use with an automotive fleet management system.

BACKGROUND OF THE INVENTION

It is known in the art to provide a list or database of vehicles available to a user and to provide for an automated or manual system for attending to reservations of the vehicles in the motor pool. A system of this type is common to car rental services, for example. There is still a necessity, however, that a motor pool area be attended by staff to monitor the pick-up and drop-off of vehicles based on the information included in the reservation system.

Furthermore, staff at the motor pool area are generally tasked with recording data on the vehicles, such as mileage readings, to ensure the proper maintenance schedules are kept for each particular vehicle. This may become especially problematic when a motor pool includes a substantially large number of vehicles, or when the vehicles in the motor pool are located in more than one possible area. This situation arises, for example, in maintaining transport truck fleets and public works vehicles such as maintenance or parking authority vehicles.

There is a need in the art for improved methods and systems related to fleet management in order to mitigate one or more of the aforementioned problems in the art.

SUMMARY OF THE INVENTION

In accordance with one embodiment of the invention, there is provided a system for managing a fleet of vehicles including a reservation system for generating a reservation code; a key cabinet including user-entry means for entering said reservation code and one or more key compartments storing keys for each vehicle in the fleet; a control module in communication with the reservation system and the key cabinet for assigning an unlocked condition to at least one of the key compartments based on entry of a reservation code.

According to one aspect of the invention, the reservation system includes a server having a reservation module accessible via a network, and arranged such that one or more users accesses the reservation module to indicate a desired use of a vehicle in the fleet. According to another aspect of the invention, the reservation system generates the reservation code based on a vehicle assignment by the control module. Alternatively, the reservation system generates the reservation code based on a vehicle explicitly selected by the one or more users. Preferably, the reservation system, or alternatively the control module, is adapted to send the reservation code to a user.

According to another aspect of the invention, the user-entry means is a keypad for entering the reservation code. Preferably, the control module provides access to one of the key compartments based on the reservation code.

According to another aspect of the invention, the system further includes data transmission means provided on each of the vehicles in the fleet. Preferably, the data transmission means is adapted to send information to the control module indicative of a vehicle leaving a vehicle lot upon detection of the vehicle leaving the lot.

According to another aspect of the invention, the data transmission means transmits additional information to the control module. This information may include one or more of mileage of a vehicle, gas level, location of the vehicle, vehicle engine conditions, and number of passengers in the vehicle.

According to another aspect of the invention, the key cabinet further includes a user authentication module for confirming the identity of a user entering the reservation code. Furthermore, the key cabinet may include signaling means for indicating the presence or absence of a key within each of the key compartments. A return key indicator may also be provided for giving an indication to a user showing which one of the key compartments a key should be returned upon return of the vehicle.

According to another embodiment of the invention, there is provided a for managing a fleet of vehicles including the steps of providing a reservation system by which a user reserves a vehicle from said fleet of vehicles; generating a reservation code; providing a key cabinet including user-entry means for entering the reservation code and one or more key compartments storing keys for each vehicle in the fleet; assigning an unlocked condition to at least one of the key compartments based on entry of the reservation code.

According to an aspect of this embodiment, the reservation system includes a server having a reservation module accessible via a network, and the method further includes the step of accessing the reservation module and indicating a desired use of a vehicle in the fleet. According to another aspect, a vehicle is assigned to the reservation code such that the appropriate key compartment on the key cabinet may be unlocked. The vehicle assignment may be determined by one of a control module and a user. The method preferably also includes sending the reservation code to a user. According to another aspect, access to one of the key compartments is provided based on the reservation code.

Preferably, there is further provided data transmission means on each of the vehicles in the fleet. The method may include sending information indicative of a vehicle leaving a vehicle lot upon detection of the vehicle leaving the lot.

According to another aspect, the method further includes transmitting vehicle data to a control module. The data may include one or more of mileage of a vehicle, gas level, location of the vehicle, vehicle engine conditions, and number of passengers in said vehicle.

According to another aspect of the invention, the method includes an indication to a user showing one of the key compartments to which a key should be returned upon return of the vehicle to the lot.

It is an object of the invention to solve one or more of the defects in the prior art herein identified.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1:
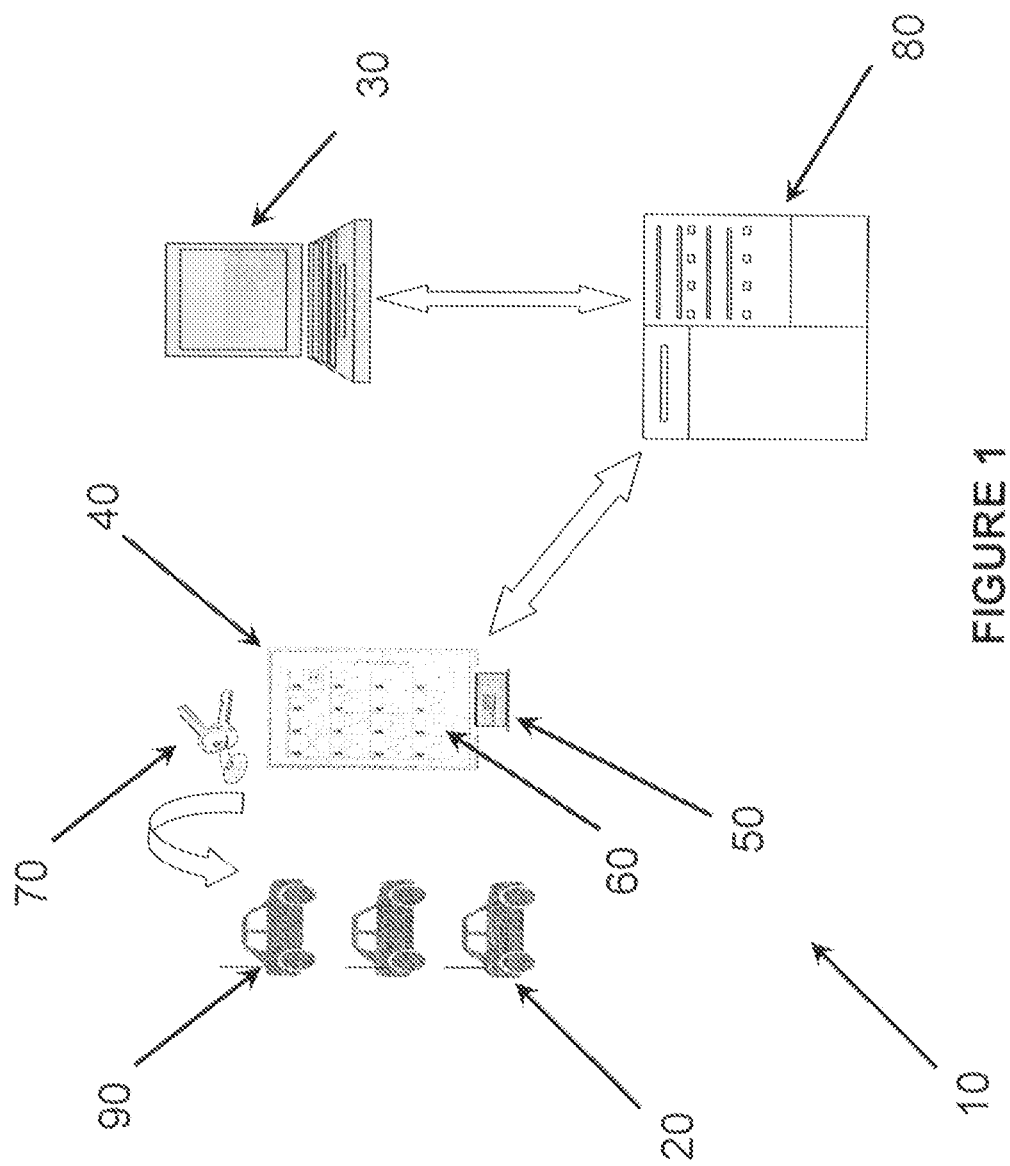
FIG. 1 shows a system for managing a fleet of vehicles according to the invention.

Referring now to FIG. 1, there is shown one embodiment of the invention in which there is generally provided a system 10 for managing a fleet of vehicles 20 includes a reservation system 30 for generating a reservation code, a key cabinet 40 including user-entry means 50 for entering a reservation code and one or more key compartments 60 storing keys 70 for each vehicle in the fleet 20, and a control module 80 in communication with the reservation system 30 and with the key cabinet 40. The control module 80 performs various functions as will be discussed in greater detail below, including assigning locked and unlocked conditions to each of the key compartments 60 based on the reservation code.

Figure 2:
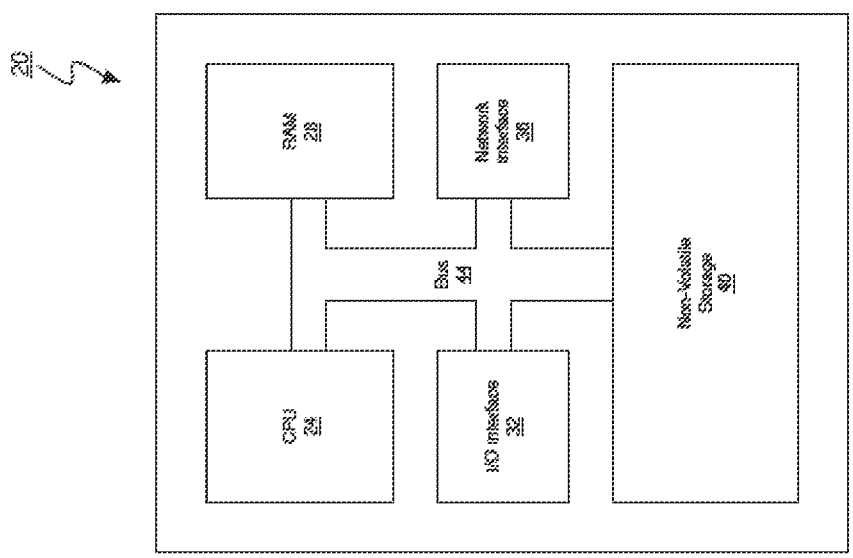
FIG. 2 show a representative computer system for use in implementing various aspect of the system of FIG. 1.

The key cabinet 40 is preferably an electronic key cabinet 40 and may include a computer system, or similar control system for controlling various aspects of the key cabinet 40 as described in further detail below. The control module 80 is also preferably a computer system that is in network communication with one or more components of the system 10 as herein described. The computer systems that are included in these or other elements of the invention may generally include, as shown in FIG. 2, a number of physical and logical components, including a central processing unit ("CPU") 24, random access memory ("RAM") 28, an input/output ("I/O") interface 32, a network interface 36, non-volatile storage 4, and a local bus 44 enabling the CPU 24 to communicate with the other components. The CPU 24 executes an operating system, and a number of software systems and/or software modules. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other elements of the invention described herein as being in networked communication with each other. Non-volatile storage 4 stores the operating system and programs. During operation of the computer system, the operating system, the programs and the data may be retrieved from the non-volatile storage 4 and placed in RAM 28 to facilitate execution.

Referring back to FIG. 1, the reservation system 30 may be a computer system in accordance with that herein disclosed, or a computer system operating as a server and having a reservation module thereon, accessible via a network, thereby allowing one or more users access to the reservation module to indicate a desired use of a vehicle in the fleet 20. That is, in use one or more users access the reservation system 30, for example, over the Internet, an Intranet, via e-mail, via a mobile device application, or other similar ways of corresponding with a software module, to indicate a desired use of a vehicle in the fleet 20. The desired use as indicated by a user as contemplated by the preferred embodiments of the invention may include a type of vehicle required, operating requirements for the vehicle, estimated time of use, number of passengers, or any other requirements as may be determined in putting the invention into practice. Based on the desired use, the control module 80 assigns a vehicle to the user and communicates this assignment to the reservation system 30 and to the key cabinet 40. The reservation system 30 then generates the reservation code based on this vehicle assignment. In an alternate embodiment, the user directly selects a specific vehicle in the fleet and the control module 80 corresponds with the reservation system 30 to generate a reservation code based on this specific vehicle selected by the user.

Figure 3:
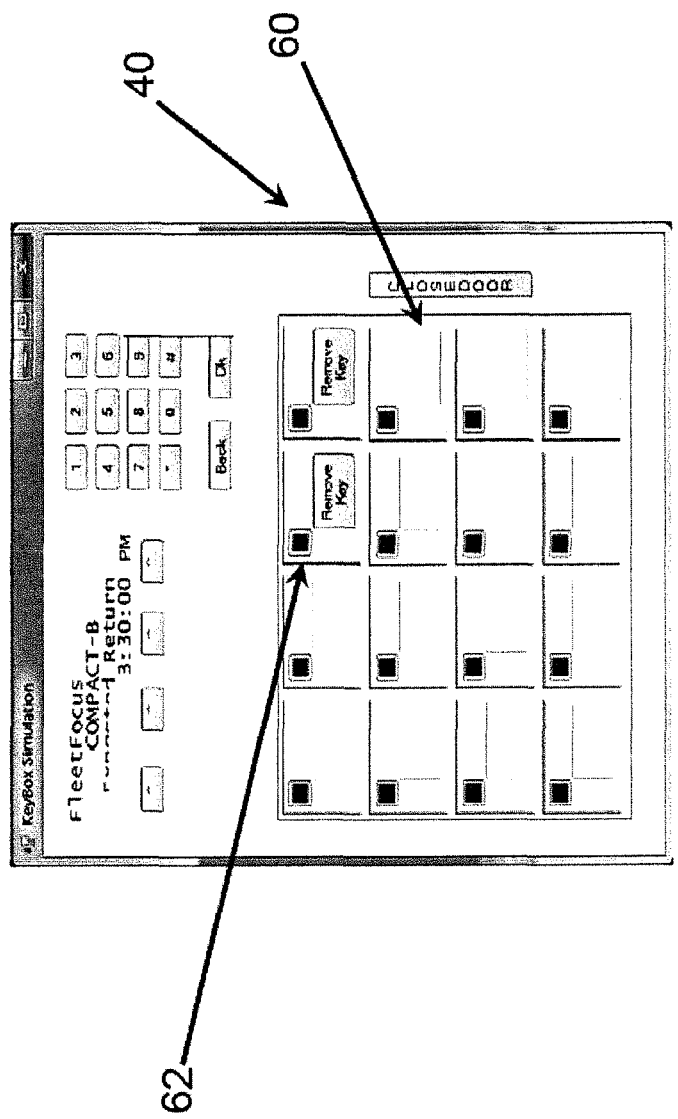
FIG. 3 shows a representative key cabinet for use with the system of FIG. 1.

The key cabinet 40 preferably includes a number of key compartments 60, where each key compartment 60 holds a key to particular vehicles in the fleet. A representative key cabinet 40 is shown in FIG. 3. The key compartments 60 are preferably arranged in a grid format. Each of the key compartments 60 preferably includes a door with signaling means thereon, in the form of a text display, LED light, or other signally means to indicate the status of the key compartment 60. For example, an indicator 62 may be provided to alert a user as to which compartment is open and accessible for a key to be removed. An indicator may also be provided to show whether a key is present in the key compartment or now. Key cabinet 40 is preferably a solid housing manufactured to be able to withstand extreme weather conditions and sustained use without regular oversight from a person. That is, key cabinet 40 is typically mounted outdoors and exposed to the weather proximate a lot in which the vehicles in the fleet are parked.

Figure 4:
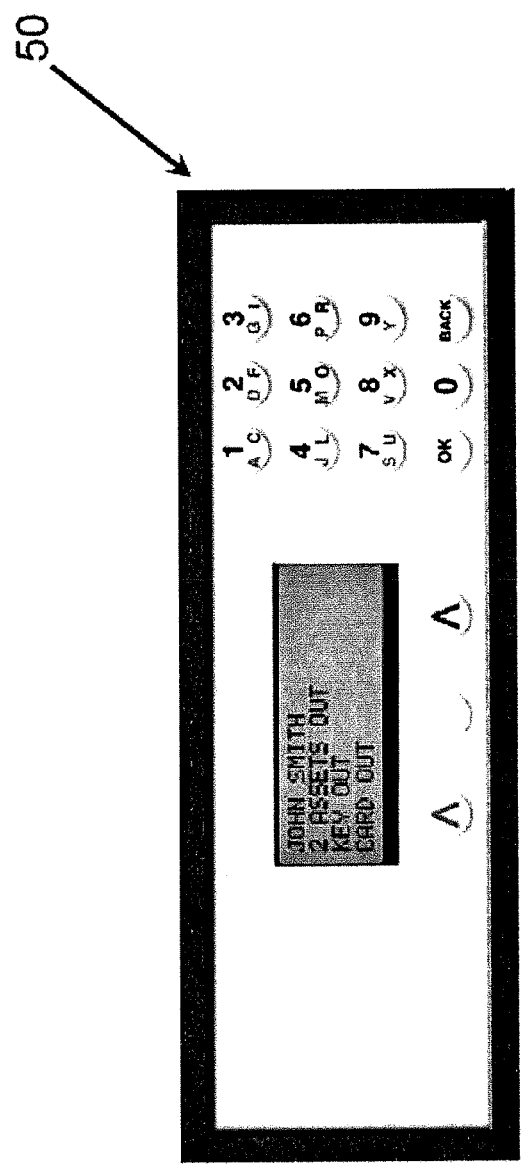
FIG. 4 shows a user-entry device for use with the system of FIG. 1.

FIG. 4 shows a representative user-entry means in the form of a keypad device 50 that would be provided at a vehicle pool location. Preferably, the keypad device 50 is manufactured to withstand various weather conditions and sustained use over long periods of time. Preferably, the visual display device is connected to, or located adjacent to the keypad device 50 and may provide a visual indication as to the number of vehicles presently checked out, the number of parking spaces available in a particular vehicle pool area, and/or any other information that would assist users, maintenance staff, or management in the course of carrying out tasks related to the vehicle pool area.

Figure 5:
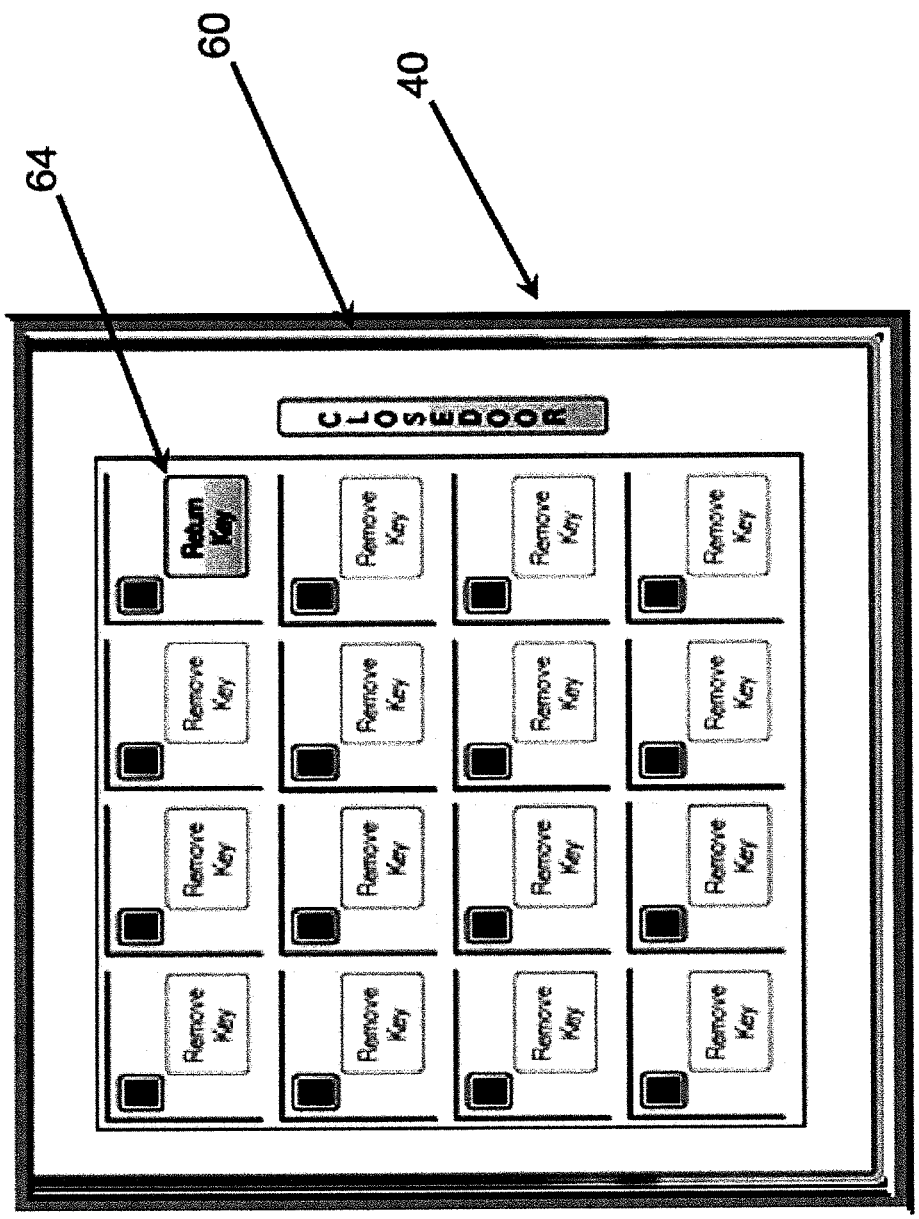
FIG. 5 shows the key cabinet of FIG. 3 on returning a key.

In one embodiment, the key cabinet 40 further includes a user authentication module for confirming the identity of a user entering the reservation code. For example, this may require a user to have a user identification card scanned by a PIN, card or biometric reader proximate the key cabinet 40 for access, or require the user to enter a user identification code, or various other means for identifying or otherwise confirming that a user is authorized to have access to the vehicles in the fleet. According to another embodiment, the key cabinet 40 is provided with signaling means to indicate the presence or absence of a key in each individual key compartment. Optionally, a return key indicator 64 may also be provided, as shown in FIG. 5, on the key cabinet 40 for providing an indication to a user as to which of the key compartments the key from a checked out vehicle should be returned. Alternatively, upon returning a vehicle, the user may be required to enter the reservation code which initiates an opening of one of the key compartments in a manner similar to when the key was obtained on checking out a vehicle.

In operation, a user, for example an employee of an entity owning the vehicle fleet receiving a work order for a delivery request, logs onto the reservation module via a web-interface and enters the type of product to be delivered, and the size of the load. The reservation module communicates this information to the control module 80, wherein a database of vehicle information is maintained. This database includes information related to the number of vehicles in the fleet, the availability of vehicles, the maintenance history and schedules of the vehicles. Based on the requirements of the user, and vehicle availability, the control module 80 assigns a particular vehicle to the user's request and communicates this information to the reservation module, where a reservation code is generated and passed on to the user, for example, by e-mail or by directly displaying the reservation code on a monitor. The control module 80 is also in communication with the key cabinet 40, and more specifically, with the controller of the key cabinet 40 and thus assigns the reservation code to a particular key compartment holding the key for the vehicle that has been assigned to the user. The key compartment is then provided with a signal that allows it to be unlocked when the reservation code is entered into the user-entry device. This occurs when the user approaches the lot at which the vehicles are parked, enters the reservation code into the user-entry device. Upon receipt of an appropriate reservation code, the controller of the key cabinet 40 unlocks the key compartment allowing access to a user. Alternatively, the key cabinet 40 may simply be in network communication with the control module 80, and when a reservation code is entered, the key is communicated to the control module 80 which sends an unlock signal back to the appropriate key compartment in the key cabinet 40 to thus allow access to a user.

Accordingly, an entire fleet of vehicles and its dispatch and return system may be automated and/or otherwise optimized to facilitate the reservation, dispatch, access, and return of vehicles in the fleet by one or more users of the vehicles. The invention is particular useful for use with large fleets of vehicles, such as, but not limited to, transport fleets, delivery fleets, general company automotive fleets, public transportation vehicle fleets, and various other industries in which a pool of vehicles is shared amongst a number of employees.

Figure 6:
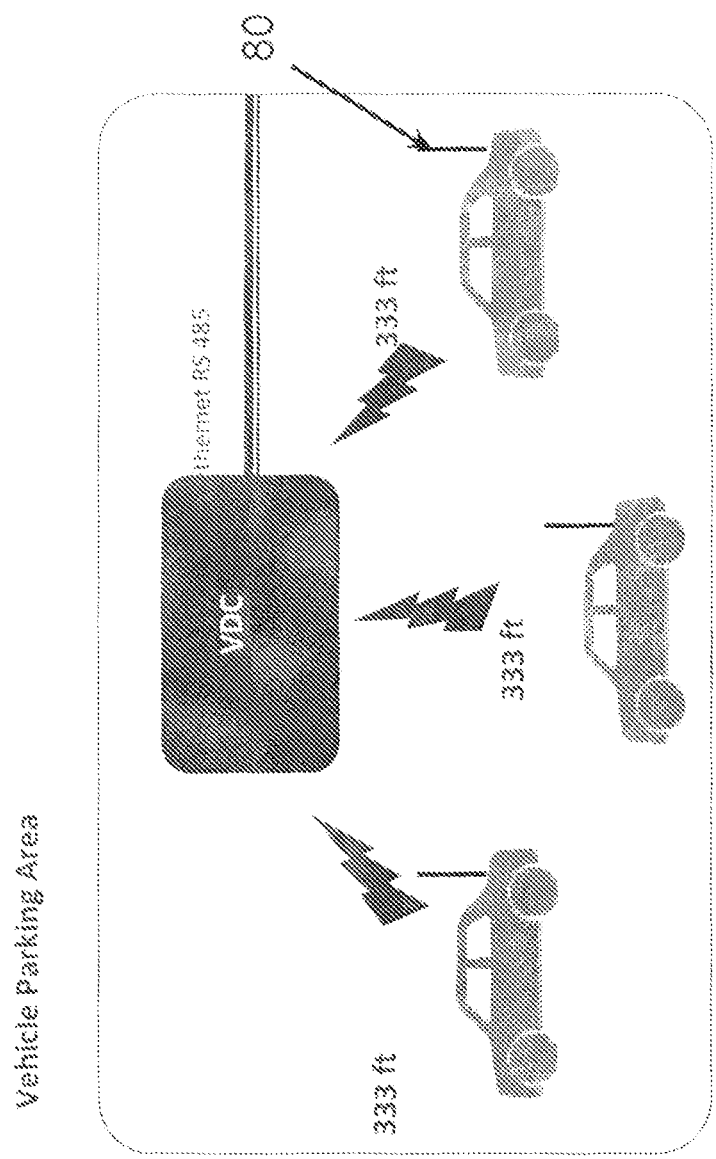
FIG. 6 shows a vehicle lot and elements of the vehicles therein according to the invention.

As shown in FIG. 6, each of the vehicles in the pool are preferably further equipped with an identification device for identifying the particular vehicle, such that data transmission means 90 may communicate specific information related to particular vehicles to the control module 80. The data transmission means 90 may include radio frequency communication devices, an onboard vehicle computer, a GPS unit having a networked connection, and various other wireless communication devices that would be known to a person skilled in the art. The data transmission means is preferably capable of accessing or being provided with all vehicle on board data, for example, one or more of mileage of a vehicle, gas level; location of said vehicle, vehicle engine conditions, and number of passengers in said vehicle.

It will be apparent that other communication devices that operate to transmit information wirelessly are all within the scope of the present invention. As the user leaves the vehicle pool area, the mileage on the car is sent to the control module 80 and recorded. When the vehicle is returned, a final mileage is sent to the control module 80. Thus, each the time the vehicle is checked out, the time it was returned, and the mileage upon leaving and returning may be stored in the database on the control module 80. As an option, if no radio frequency devices are provided, a user may manually enter the mileage or any other vehicle information prior to departure, and subsequently on return for updating the information in the control module 80. With this information, the invention provides the further benefits that alerts may be sent to maintenance staff indicating when a particular vehicle is due for maintenance, or to other staff performing various functions on the vehicles in the fleet. Furthermore, the control module 80 access this information in making a determination on which vehicle is assigned to a user. For example, vehicle reservations may be made based on vehicles with lower mileages, or based on trips where the anticipated mileage to be driven does not to exceed the mileage until the next maintenance is due.

When returning to the vehicle pool area, the mileage readings are provided to the control module 80 as described above, and the user enters the confirmation code as shown in FIG. 6. The electronic key box then provides a visual indication of a particular compartment where the key should be returned, as shown in FIG. 5.

Once the vehicle has been returned and the total mileage is recorded, a notification may be sent to the user, preferably via e-mail or other electronic medium, as shown in FIG. 8. The notification may optionally include a bill and provide additional information on the trip. Furthermore, data may also be sent to the control module 80 for subsequent access and analysis, for example, for accounting, vehicle maintenance, statistical analysis, or any other informative or functional purposes as would be apparent to those skilled in the art. Various reports may be generated and otherwise made available as required.

Real-time odometer readings from a vehicle as it is checked out subsequently checked back in are also provided. Such real-time odometer readings are updated in the control module 80 automatically, thereby reducing data entry time and possible data entry errors which may lead to incorrect maintenance schedules for particular vehicles.

Furthermore, the data transmission device provided on the vehicle may have access to engine diagnostic trouble codes and would further transmit these to the control module 80. Thus, potential vehicle problems are seamlessly and automatically captured wirelessly from the vehicle and service requests may be automatically generated.

This completes a single reservation cycle, whereby the user has made a reservation for a vehicle, retrieved the keys and subsequently the car, undertaken a trip and returned the car and the keys while the networked system described herein has recorded the mileage on the vehicle before and after the trip without the need for any staff or other attendants at the vehicle pool area. It will be apparent to one skilled in the art that the entire process is preferably automated and thus entire vehicle pools may be operated with minimal or no staff required for reserving and releasing vehicles.

The invention further provides for a method for managing a fleet of vehicles including the steps of providing a reservation system 30 by which a user reserves a vehicle from said fleet of vehicles, generating a reservation code, providing a key cabinet 40 including user-entry means 50 for entering said reservation code and one or more key compartments storing keys for each vehicle in the fleet, and, assigning locked and unlocked conditions to each said key compartments based on said reservation code. The reservation system 30, control module 80, key cabinet 40 and other system elements are as described herein, and used in the method in a manner similar to that which has been described above.

The method further comprises the step of assigning a vehicle to the reservation code. That is, particular vehicles may be associated with particular reservation codes. Additionally, the method includes the step of sending the reservation code to a user and providing access to one of the key compartments on the key cabinet 40 corresponding with a key for the vehicle assigned to the user.

In accordance with another aspect of the invention, the method further includes the steps of sending information indicative of a vehicle leaving a vehicle lot upon detection of the vehicle leaving the lot, for example, by way of the data transmission means onboard the vehicle, described earlier, or alternatively, by way of an RF tag mounted on the vehicle. The method preferably further includes the steps of transmitting vehicle data to a control module 80. The data may include one or more of mileage of a vehicle, gas level, location of said vehicle, vehicle engine conditions, and/or number of passengers in said vehicle. Various other vehicle information may also be provided such that data may be exchanged with the reservation system 30, maintenance personnel, supervisory personnel and purchasing departments for maintaining full, automated and accurate data on all vehicles in the fleet.

As will be apparent to those skilled in the art, various modifications and variations to the system and method herein described will be possible, without departing from the spirit of the invention. For example, additional diagnostic or vehicle data that has not been explicitly described may be gathered on board the vehicle and transmitted to the control module when the vehicle departs and returns to the motor pool. Other data entry, keypad, and visual display devices may be used that allow for a user to enter information provided by a reservation system and provide subsequent access to an electronic key box. It will be apparent to those skilled in the art that the invention may be used for vehicle rental purposes, vehicle sharing purposes, organizational vehicle control, and provide information and data as required and adapted to each of these types of businesses. It is further contemplated that that the system and method herein described may be operational without network connectivity. That is, the data needed to dispense and/or allocate keys may be stored locally allowing for offline operation.

The invention claimed is:

1. A system for managing a fleet of vehicles comprising:
   i. a reservation system for generating a reservation code based on a vehicle assignment and comprising a server having a reservation module accessible via a network, wherein one or more users access said reservation module to indicate a desired use of a vehicle in the fleet, wherein said reservation system receives, from a control module, said vehicle assignment, said vehicle assignment being based on said desired use of a vehicle in the fleet;
   ii. a key cabinet;
   iii. including user-entry means for entering said reservation code and a plurality of key compartments storing keys for each vehicle in the fleet;
   iv. the control module that assigns a vehicle in the fleet to a user based on said desired use of a vehicle in the fleet and communicates the vehicle assignment to said reservation system and said key cabinet for assigning an unlocked condition to a first key compartment of said key compartments holding the key to the vehicle, based on entry of said reservation code.

2. A system according to claim 1 wherein the desired use of a vehicle in the fleet indicated by the one or more users comprises at least one of a type of vehicle required and number of passengers.

3. A system according to claim 2, wherein said reservation system generates said reservation code based on a vehicle selected by said one or more users.

4. A system according to claim 2, wherein said reservation system is adapted to send said reservation code to a user.

5. A system according to claim 2, wherein said control module provides access to one of said key compartments based on said reservation code.

6. A system according to claim 1, wherein said user-entry means comprises a keypad for entering said reservation code.

7. A system according to claim 1, further comprising data transmission means provided on each of the vehicles in the fleet.

8. A system according to claim 7, wherein said data transmission means is adapted to send information indicative of a vehicle leaving a vehicle lot upon detection of said vehicle leaving said lot.

9. A system according to claim 7, wherein said data transmission means transmits information to said control module; wherein said information comprises one or more of mileage of a vehicle, gas level; location of said vehicle, vehicle engine conditions, and number of passengers in said vehicle.

10. A system according to claim 1, wherein said key cabinet further includes a user authentication module for confirming the identity of a user entering said reservation code.

11. A system according to claim 1, wherein said key cabinet further includes signaling means for indicating the presence or absence of a key within each said key compartments.

12. A system according to claim 1, further comprising a return key indicator for providing an indication to a user showing one of said key compartments to which a key should be returned upon return of the vehicle.

13. The system of claim 1, wherein the control module further communicates the reservation code, entered upon returning a vehicle, to the key cabinet for assigning an unlocked condition to a second key compartment of said key compartments, providing an indication to said user as to which of said key compartments said key should be returned.

14. A method for managing a fleet of vehicles comprising:
   i. providing a reservation system by which a user reserves a vehicle from said fleet of vehicles wherein said reservation system comprises a server having a reservation module accessible via a network;
   ii. accessing said reservation module and indicating a desired use of a vehicle in the fleet;
   iii. receiving a vehicle assignment based on the desired use of a vehicle in the fleet;
   iv. generating a reservation code based on the vehicle assignment;
   v. providing a key cabinet including user-entry means for entering said reservation code and a plurality of key compartments storing keys for each vehicle in the fleet;
   vi. assigning an unlocked condition to a first key compartment of said key compartments holding the key to the vehicle for said user to remove, based on entry of said reservation code.

15. A method according to claim 14 wherein the desired use of a vehicle in the fleet comprises at least one of a type of vehicle required and number of passengers.

16. A method according to claim 15, further comprising assigning a vehicle to said reservation code.

17. A method according to claim 16, wherein said vehicle assignment is determined by one of a control module and a user.

18. A method according to claim 15, further comprising sending said reservation code to a user.

19. A method according to claim 15, comprising providing access to one of said key compartments based on said reservation code.

20. A method according to claim 14, wherein said user-entry means comprises a keypad for entering said reservation code.

21. A method according to claim 3, further comprising providing data transmission means on each of the vehicles in the fleet.

22. A method according to claim 21, further comprising sending information indicative of a vehicle leaving a vehicle lot upon detection of said vehicle leaving said lot.

23. A method according to claim 21, further comprising transmitting vehicle data to a control module; wherein said data comprises one or more of mileage of a vehicle, gas level; location of said vehicle, vehicle engine conditions, and number of passengers in said vehicle.

24. A method according to claim 14, further comprising providing a user authentication module for confirming the identity of a user entering said reservation code.

25. A method according to claim 14, further comprising providing a signal indicative of the presence or absence of a key within each said key compartments.

26. A method according to claim 14, further comprising providing an indication to a user showing one of said key compartments to which a key should be returned upon return of the vehicle.

27. The method of claim 14, further comprising assigning an unlocked condition to a second key compartment of said key compartments, providing an indication to said user as to which of said key compartments said key should be returned, based on entry of said reservation code entered upon returning a vehicle.

* * * * *